United States Patent
Venkatesan et al.

(10) Patent No.: US 10,687,235 B2
(45) Date of Patent: Jun. 16, 2020

(54) ACCESS POINT (AP), STATION (STA) AND METHODS TO NEGOTIATE FINE TIMING MEASUREMENT (FTM) PARAMETERS

(71) Applicant: Intel IP Corporation, Santa Clara, CA (US)

(72) Inventors: Ganesh Venkatesan, Hillsboro, OR (US); Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/322,079

(22) PCT Filed: Oct. 24, 2017

(86) PCT No.: PCT/US2017/058061
§ 371 (c)(1),
(2) Date: Jan. 30, 2019

(87) PCT Pub. No.: WO2018/081100
PCT Pub. Date: May 3, 2018

(65) Prior Publication Data
US 2019/0191323 A1   Jun. 20, 2019

Related U.S. Application Data

(60) Provisional application No. 62/412,654, filed on Oct. 25, 2016, provisional application No. 62/481,974, filed on Apr. 5, 2017.

(51) Int. Cl.
*H04L 12/26* (2006.01)
*H04W 24/08* (2009.01)
(Continued)

(52) U.S. Cl.
CPC ........... *H04W 24/08* (2013.01); *H04L 1/0009* (2013.01); *H04L 5/0055* (2013.01);
(Continued)

(58) Field of Classification Search
CPC ..... H04W 24/08; H04W 24/10; H04W 88/08; H04W 24/02; H04W 72/0446
See application file for complete search history.

(56) References Cited

U.S. PATENT DOCUMENTS

| | | | |
|---|---|---|---|
| 2014/0335885 A1* | 11/2014 | Steiner | H04W 64/00 455/456.1 |
| 2015/0049716 A1* | 2/2015 | Gutierrez | H04W 84/12 370/329 |

(Continued)

FOREIGN PATENT DOCUMENTS

| | | |
|---|---|---|
| WO | WO-2018081100 A1 | 5/2018 |

OTHER PUBLICATIONS

"International Application Serial No. PCT/US2017/058061, International Search Report dated Feb. 1, 2018", 3 pgs.

(Continued)

*Primary Examiner* — Atique Ahmed
(74) *Attorney, Agent, or Firm* — Schwegman Lundberg & Woessner, P.A.

(57) ABSTRACT

Embodiments of an access point (AP), station (STA) and methods of communication are generally described herein. The AP may transmit a trigger frame (TF) that indicates resource units (RUs) that are available for contention based access by STAs for a fine timing measurement (FTM) protocol. The AP may attempt to decode one or more initial fine timing measurement request (iFTMR) frames received in the indicated RUs. The AP may transmit a broadcast acknowledgement (ACK) frame that indicates whether at least one iFTMR frame was decoded. The AP may, for a (Continued)

decoded iFTMR frame: allocate the RU corresponding to the decoded iFTMR frame to a corresponding STA for the FTM protocol; and transmit, in the corresponding RU, an initial fine timing measurement (iFTM) frame that includes an identifier of the corresponding STA.

19 Claims, 10 Drawing Sheets

(51) Int. Cl.
| | | |
|---|---|---|
| | *H04W 74/00* | (2009.01) |
| | *H04L 1/00* | (2006.01) |
| | *H04L 5/00* | (2006.01) |
| | *H04L 27/26* | (2006.01) |
| | *H04W 84/12* | (2009.01) |

(52) U.S. Cl.
CPC ....... *H04L 27/2626* (2013.01); *H04W 74/006* (2013.01); *H04W 84/12* (2013.01)

(56) References Cited

U.S. PATENT DOCUMENTS

| | | | |
|---|---|---|---|
| 2015/0094103 A1* | 4/2015 | Wang | H04W 4/023 455/456.6 |
| 2015/0257028 A1* | 9/2015 | Chu | G01S 13/74 370/252 |
| 2016/0044524 A1 | 2/2016 | Ben-haim et al. | |
| 2016/0128102 A1* | 5/2016 | Jauh | H04W 74/0833 370/329 |
| 2016/0183171 A1 | 6/2016 | Hareuveni et al. | |
| 2017/0134978 A1* | 5/2017 | Vamaraju | H04W 64/00 |
| 2017/0230969 A1* | 8/2017 | Aldana | H04W 4/70 |

OTHER PUBLICATIONS

"International Application Serial No. PCT/US2017/058061, Written Opinion dated Feb. 1, 2018", 9 pgs.

Carlos, Aldana, et al., "IEEE P802.11 Wireless LANs Further Clarifications to FTM Protocol", IEEE 802.11 Documents, (May 13, 2015).

Chittabrata, Ghosh, et al., "Location Measurement Protocol for Unassociated STAs", IEEE 802.11 Documents, doc: IEEE 802.11-16/1260r0, (Sep. 13, 2016), 13-14.

"International Application Serial No. PCT US2017 058061, International Preliminary Report on Patentability dated May 9, 2019", 11 pgs.

* cited by examiner

US 10,687,235 B2

ACCESS POINT (AP), STATION (STA) AND METHODS TO NEGOTIATE FINE TIMING MEASUREMENT (FTM) PARAMETERS

PRIORITY CLAIM

This application is a U.S. National Stage Filing under 35 U.S.C. 371 from International Application No. PCT/US2017/058061, filed Oct. 24, 2017 and published in English as WO 2018/081100 on May 3, 2018, which claims priority to U.S. Provisional Patent Application Ser. No. 62/412,654, filed Oct. 25, 2016, and to U.S. Provisional Patent Application Ser. No. 62/481,974, filed Apr. 5, 2017, all of which are incorporated herein by reference in their entirety.

TECHNICAL FIELD

Embodiments pertain to wireless communications. Some embodiments relate to wireless local area networks (WLANs) and Wi-Fi networks including networks operating in accordance with the IEEE 802.11 family of standards. Some embodiments relate to communication in accordance with IEEE 802.11ax networks and/or IEEE 802.11az networks. Some embodiments relate to allocation of resource units (RUs) for a fine timing measurement (FTM) protocol. Some embodiments relate to measurement of timing information. Some embodiments relate to channel sounding.

BACKGROUND

In some cases, an access point (AP) may communicate with one or more stations (STAs) to exchange data and/or other information. The AP may utilize timing information of the STAs for various functions related to the communication, such as scheduling of uplink data transmissions and/or downlink data transmissions. Various control information may be exchanged to enable determination of the timing information. At least a portion of the available time resources and frequency resources may be utilized to exchange the control information. Accordingly, the amount of data that can be exchanged between the AP and the STAs in those resources may depend on an efficiency for the exchange of control information. Therefore, there is a general need for methods and systems to enable determination of timing information in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
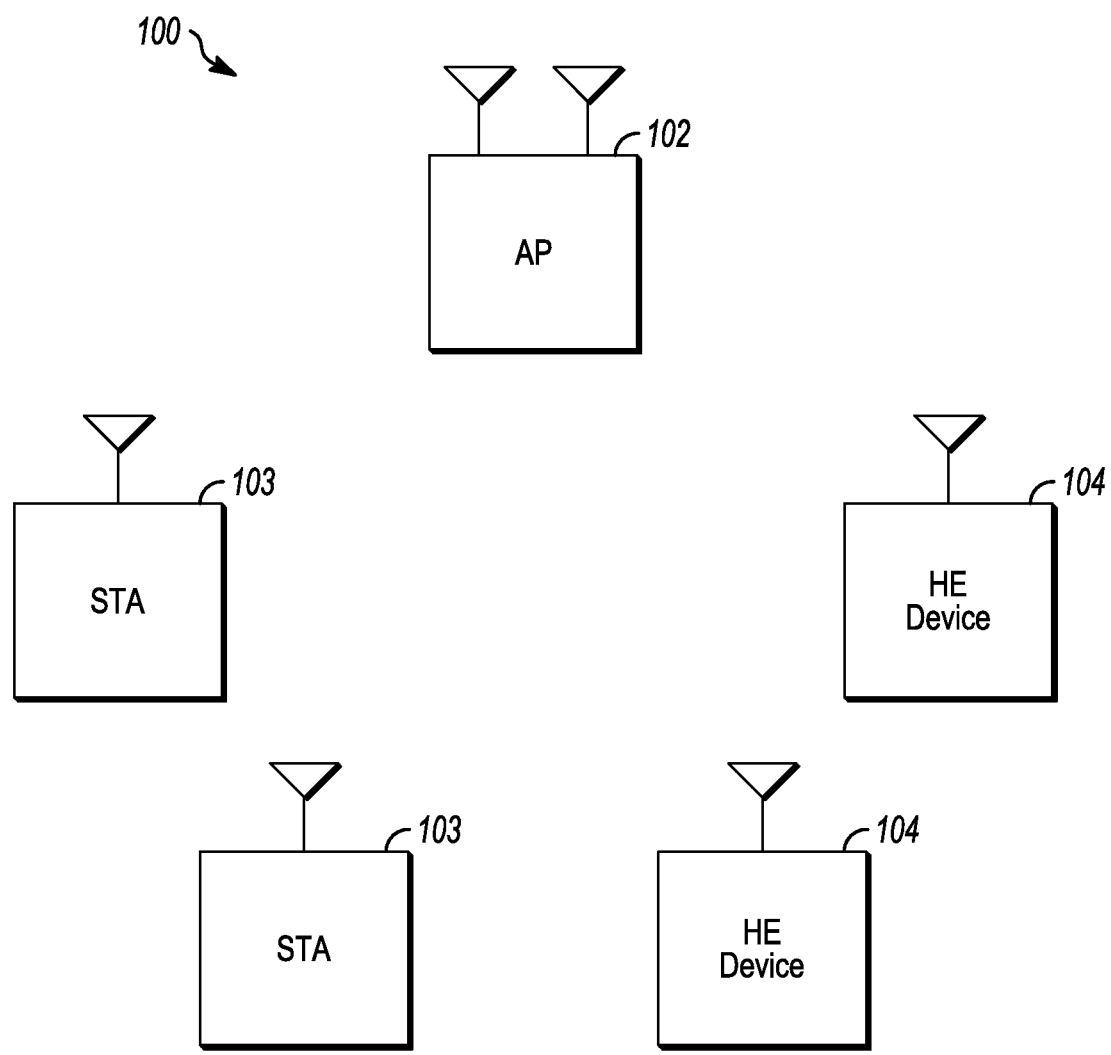
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE operation in some cases, non-HE operation in some cases, and a combination of HE operation and non-HE operation in some cases.

Referring to FIG. 1, the network 100 may include any or all of the components shown, and embodiments are not limited to the number of each component shown in FIG. 1 and are also not limited to the types of components shown in FIG. 1. Embodiments are also not limited by the example network 100 in terms of the arrangement of the components or the connectivity between components as shown. In addition, some embodiments may include additional components.

In some embodiments, the network 100 may include an AP 102 (which may be a master station in some embodiments) and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below. In some embodiments, the AP 102 may receive and/or detect signals from one or more HE devices 104, and may transmit data packets to one or more HE devices 104.

It should be noted that embodiments are not limited to networks that include APs 102, however, as other base station components may be included in some embodiments. Such components may or may not be arranged to operate in accordance with a standard, in some embodiments. As an example, an Evolved Node-B (eNB) arranged to operate in accordance with one or more Third Generation Partnership Project (3GPP) standards, including but not limited to 3GPP Long Term Evolution (LTE) standards, may be used in some cases.

In some embodiments, the STAs 103 may be arranged to operate in accordance with one or more IEEE 802.11 standards, including but not limited to 802.11ax and/or 802.11az. These embodiments are not limiting, however, as other mobile devices, portable devices and/or other devices, which may or may not be arranged to operate in accordance with a standard, may be used in some embodiments. As an example, a User Equipment (UE) arranged to operate in accordance with one or more Third Generation Partnership Project (3GPP) standards, including but not limited to 3GPP LTE standards, may be used in some cases.

The AP 102 may be arranged to communicate with one or more of the components shown in FIG. 1 in accordance with one or more IEEE 802.11 standards (including 802.11ax, 802.11az and/or others), other standards and/or other communication protocols. It should be noted that embodiments are not limited to usage of an AP 102. References herein to the AP 102 are not limiting and references herein to a master station are also not limiting. In some embodiments, an STA 103, an MU operation device (device capable of MU operation), an HE device 104 and/or other device may be configurable to operate as a master station. In some embodiments, operations that may be performed by the AP 102 as described herein may be performed by the STA 103, an MU operation device, an HE device 104, a device that is configurable to operate as an AP 102 and/or a device that is configurable to operate as a master station.

In some embodiments, the STA 103 may be configured to operate as an HE device 104. References herein to an STA 103 or to an HE device 104 are not limiting. Although descriptions herein may refer to performance of one or more techniques, operations and/or methods by an STA 103, it is understood that some or all of those techniques, operations and/or methods may be performed by an HE device 104, in some embodiments. In addition, it is understood that some or all of those techniques, operations and/or methods may be performed by an STA103 configured to operate as an HE device 104, in some embodiments.

In some embodiments, communication between the AP 102 and the STAs 103 and/or communication between the STAs 103 may be performed in accordance with one or more standards, such as an 802.11 standard (including legacy 802.11 standards), a 3GPP standard (including 3GPP LTE standards) and/or other standards. These embodiments are not limiting, however, as other communication techniques and/or protocols (which may or may not be included in a standard) may be used for the communication between the AP 102 and the STAs 103 and/or the communication between the STAs 103, in some embodiments. Embodiments are not limited to communication as part of a network. In some embodiments, communication between two or more STAs 103 may not necessarily involve a network. In some cases, at least a portion of the communication may include direct communication between the STAs 103.

It should also be noted that the AP 102 may operate as an STA 103, in some embodiments. Some techniques, operations and/or methods may be described herein in terms of communication between two STAs 103, but such descriptions are not limiting. Some or all of those techniques, operations and/or methods may be applicable to scenarios in which an STA 103 and an AP 102 communicate. In addition, some techniques, operations and/or methods may be described herein in terms of communication between an STA 103 and an AP 102, but such descriptions are not limiting. Some or all of those techniques, operations and/or methods may be applicable to scenarios in which two or more STAs 103 communicate.

In some embodiments, one or more of the STAs 103 may be legacy stations (for instance, a non MU operation device and/or device not capable of MU operation). These embodiments are not limiting, however, as an STA 103 may be configured to operate as an HE device 104 or may support HE operation, in some embodiments. The AP 102 may be arranged to communicate with the STAs 103 and/or the HE devices 104 in accordance with one or more of the IEEE 802.11 standards, including 802.11ax, 802.11az and/or others. In accordance with some embodiments (including but not limited to HE operation embodiments), an AP 102 may operate as a master station.

In some embodiments, the AP 102 may be arranged to contend for a wireless medium (e.g., during a contention period) to receive exclusive control of the medium for an 802.11 air access control period (i.e., a transmission opportunity (TXOP)). The AP 102 may, for example, transmit a master-sync or control transmission at the beginning of the 802.11 air access control period (including but not limited to an HE control period) to indicate, among other things, which STAs 103 and/or HE devices 104 are scheduled for communication during the 802.11 air access control period. During the 802.11 air access control period, the scheduled STAs 103 and/or HE devices 104 may communicate with the AP 102 in accordance with a non-contention based multiple access technique. This is unlike conventional Wi-Fi communications in which devices communicate in accordance with a contention-based communication technique, rather than a non-contention based multiple access technique. During the 802.11 air access control period, the AP 102 may communicate with STAs 103 and/or HE devices 104 using one or more MU PPDUs. During the 802.11 air access control period, STAs 103 not operating in accordance with HE operation may refrain from communicating in some cases. In some embodiments, the master-sync transmission may be referred to as a control and schedule transmission.

In some embodiments, the multiple-access technique used during the 802.11 air access control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique or combination of the above. These multiple-access techniques used during the 802.11 air access control period may be configured for uplink or downlink data communications.

The AP 102 may also communicate with STAs 103 and/or other legacy stations in accordance with legacy IEEE 802.11 communication techniques. In some embodiments, the AP 102 may also be configurable to communicate with the STAs 103 and/or legacy stations outside the 802.11 air access control period in accordance with legacy IEEE 802.11 communication techniques, although this is not a requirement.

In some embodiments, communication (including but not limited to communication during the control period) may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of a communication may be configured for transmitting a number of spatial streams.

In some embodiments, multi-user (MU) techniques may be used, although the scope of embodiments is not limited in this respect. As an example, MU techniques included in 802.11ax standards, 802.11az standards and/or other standards may be used. In accordance with some embodiments, an AP 102, STA 103 and/or HE device 104 may generate an MU packet in accordance with a short preamble format or a long preamble format. The MU packet may comprise a legacy signal field (L-SIG) followed by one or more MU signal fields (HE-SIG) and an MU long-training field (MU-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

In some embodiments, the STAs 103, AP 102, other mobile devices, other base stations and/or other devices may be configured to perform operations related to contention based communication. As an example, a communication between an STAs 103 and an AP 102 may be performed in accordance with contention based techniques. As another example, a communication between multiple STAs 103 may be performed in accordance with contention based techniques. In these examples and other scenarios, the STAs 103 and/or AP 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard.

It should be noted that embodiments are not limited to usage of contention based techniques, however, as some communication (such as that between mobile devices and/or communication between a mobile device and a base station) may be performed in accordance with schedule based techniques. Some embodiments may include a combination of contention based techniques and schedule based techniques.

In some embodiments, communication may be performed in accordance with any suitable multiple-access techniques and/or multiplexing techniques. Such communication may include, but is not limited to, communication between multiple STAs 103 and/or communication between an STA 103 and an AP 102. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

In some embodiments, channels used for communication between STAs 103 and/or APs 102 may be 2.16 GHz, 4.32 GHz, 6.48 GHz, 8.72 GHz and/or other suitable value. In some embodiments, channels used for communication between STAs 103 and/or APs 102 may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel may be configured for transmitting a number of spatial streams, in some embodiments. The values given above may be part of an 802.11 standard, in some cases, although embodiments are not limited as such. These embodiments are not limiting, however, as other suitable bandwidths may be used in some embodiments. In addition, embodiments are not limited to channel types or channel sizes that are included in a standard.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
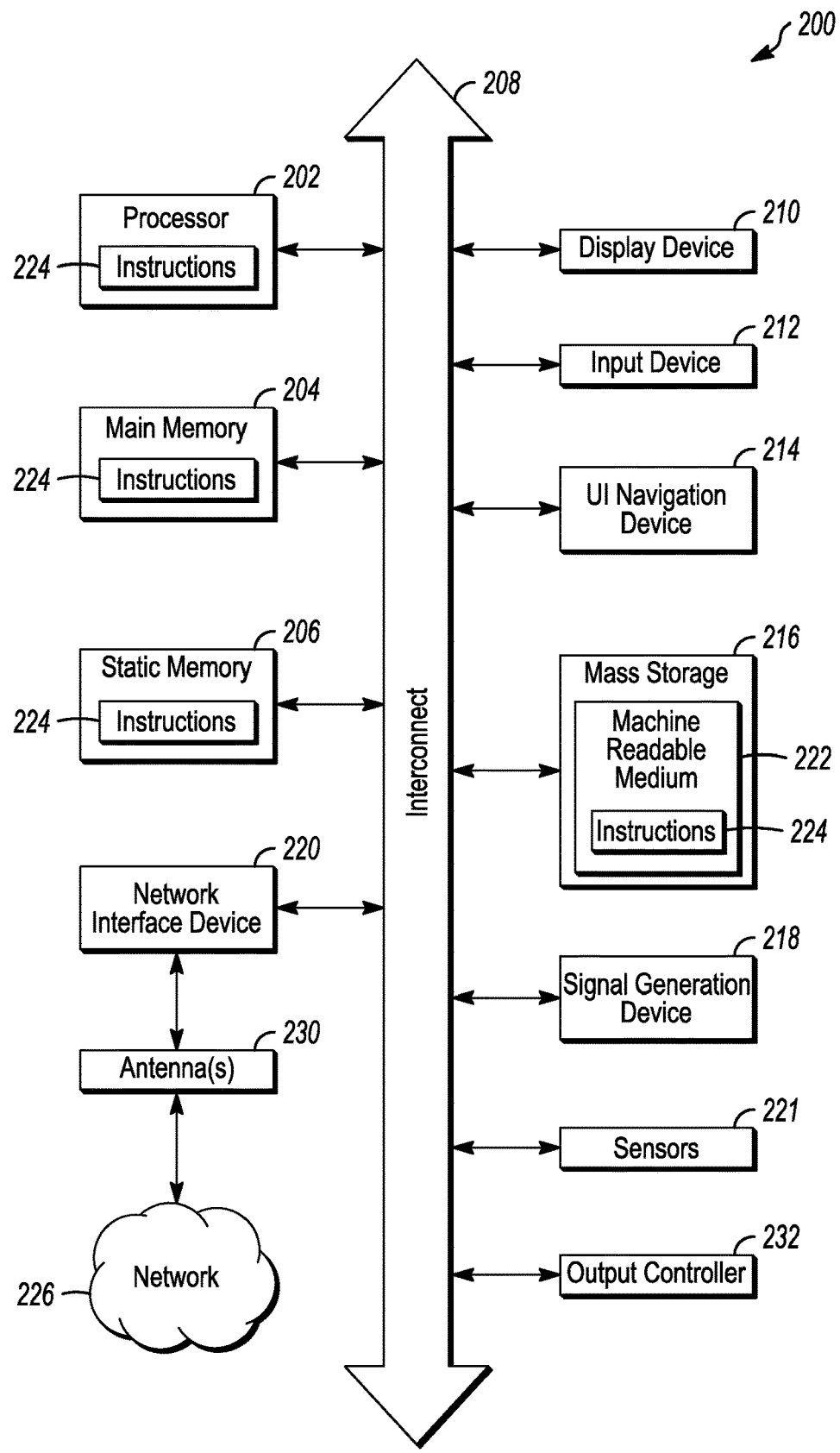
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device 104, User Equipment (UE), Evolved Node-B (eNB), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times.

Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
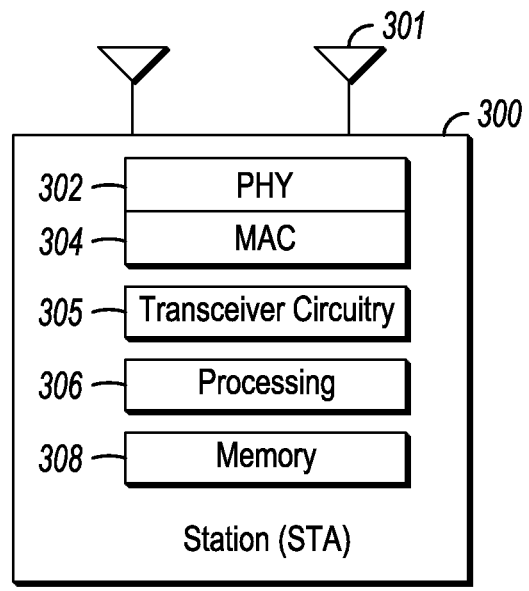
FIG. 3 illustrates a station (STA) in accordance with some embodiments and an access point (AP) in accordance with some embodiments.
Figure 3:
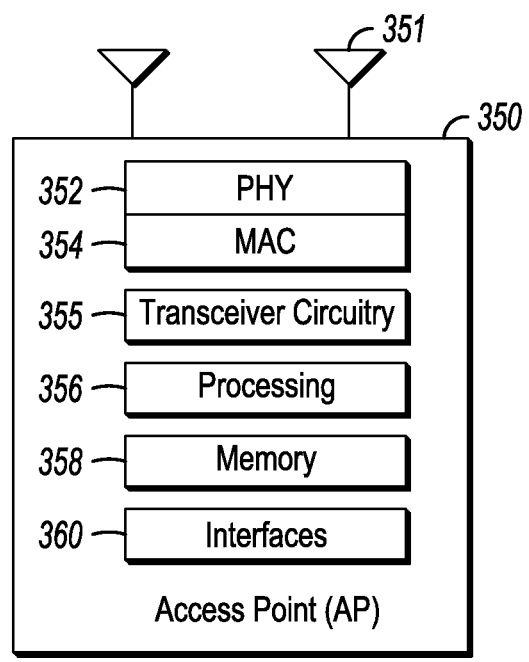

FIG. 3 illustrates a station (STA) in accordance with some embodiments and an access point (AP) in accordance with some embodiments. It should be noted that in some embodiments, an STA, HE device and/or other mobile device may include one or more components shown in any of FIG. 2, FIG. 3 (as in 300) or FIGS. 4-7. In some embodiments, the STA 300 may be suitable for use as an STA 103 as depicted in FIG. 1, although the scope of embodiments is not limited in this respect. In some embodiments, the STA 300 may be suitable for use as an HE device 104 as depicted in FIG. 1, although the scope of embodiments is not limited in this respect. It should also be noted that in some embodiments, an AP or other base station may include one or more components shown in any of FIG. 2, FIG. 3 (as in 350) or FIGS. 4-7. In some embodiments, the AP 350 may be suitable for use as an AP 102 as depicted in FIG. 1, although the scope of embodiments is not limited in this respect.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured to communicate using OFDM and/or OFDMA communication signals over a multicarrier communication channel. In some embodiments, the AP 350 may be configured to communicate using OFDM and/or OFDMA communication signals over a multicarrier communication channel. Accordingly, in some cases, the STA 300 and/or AP 350 may be configured to receive signals in accordance with specific communication standards, such as the Institute of Electrical and Electronics Engineers (IEEE) standards including IEEE 802.11-2012, 802.11n-2009, 802.11ac-2013 standards, 802.11ax standards (and/or proposed standards), 802.11ay standards (and/or proposed standards) and/or other, although the scope of the embodiments is not limited in this respect as they may also be suitable to transmit and/or receive communications in accordance with other techniques and standards. In some other embodiments, the AP 350 and/or the STA 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the STA 300 may include various components of the STA 300 as shown in FIG. 3 and/or the example machine 200 as shown in FIG. 2 and/or various components shown in FIGS. 4-7. Accordingly, techniques and operations described herein that refer to the STA 300 (or 103) may be applicable to an apparatus of an STA, in some embodiments. In addition, techniques and operations described herein that refer to the STA 300 (or 103) may be applicable to an apparatus of an HE device, in some embodiments.

It should also be noted that in some embodiments, an apparatus of the AP 350 may include various components of the AP 350 as shown in FIG. 3 and/or the example machine 200 as shown in FIG. 2 and/or various components shown in FIGS. 4-7. Accordingly, techniques and operations described herein that refer to the AP 350 (or 102) may be applicable to an apparatus of an AP, in some embodiments. In addition, an apparatus of a mobile device and/or base station may include one or more components shown in FIGS. 2-7, in some embodiments. Accordingly, techniques and operations described herein that refer to a mobile device and/or base station may be applicable to an apparatus of a mobile device and/or base station, in some embodiments.

Figure 4:
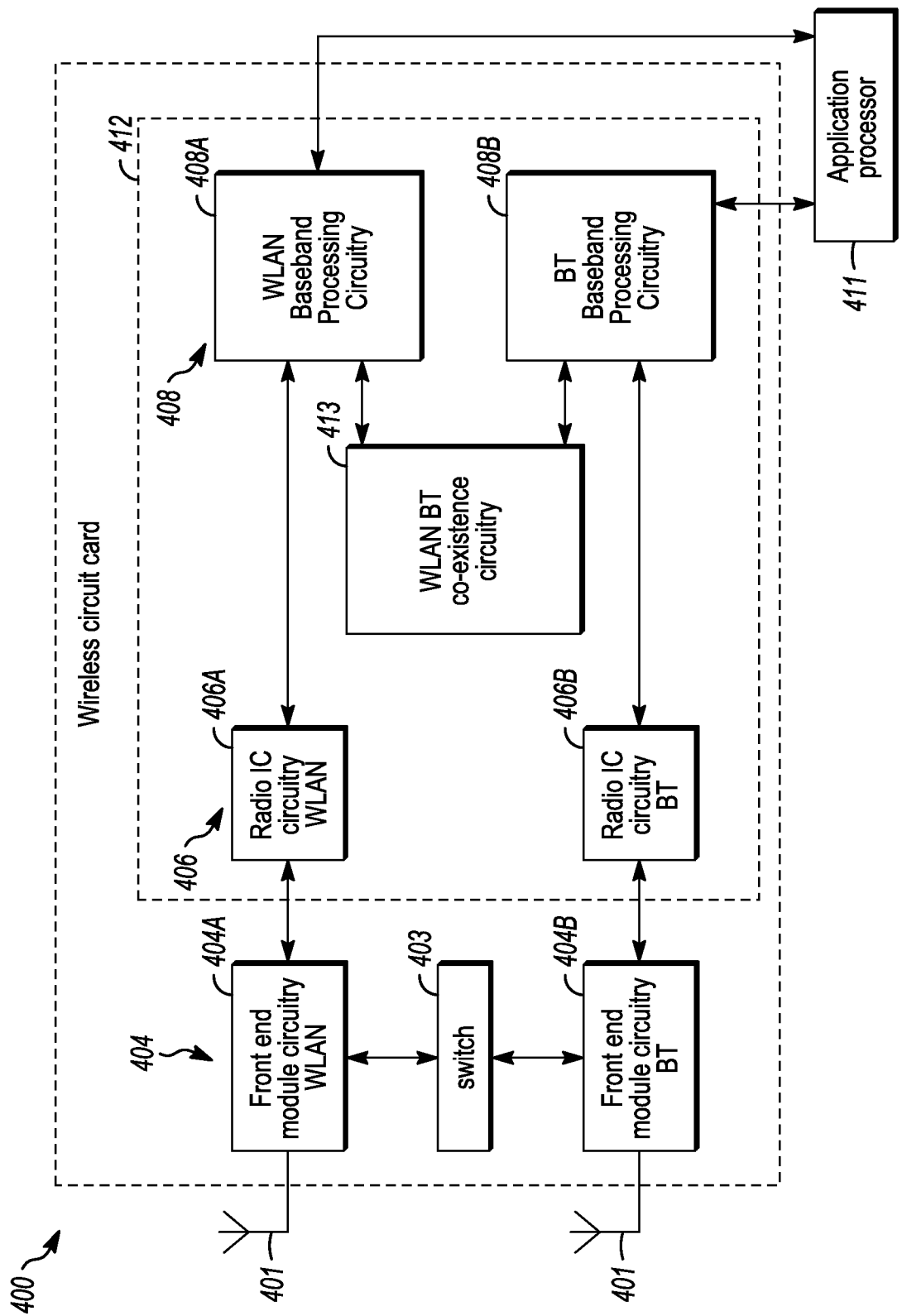
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

Figure 5:
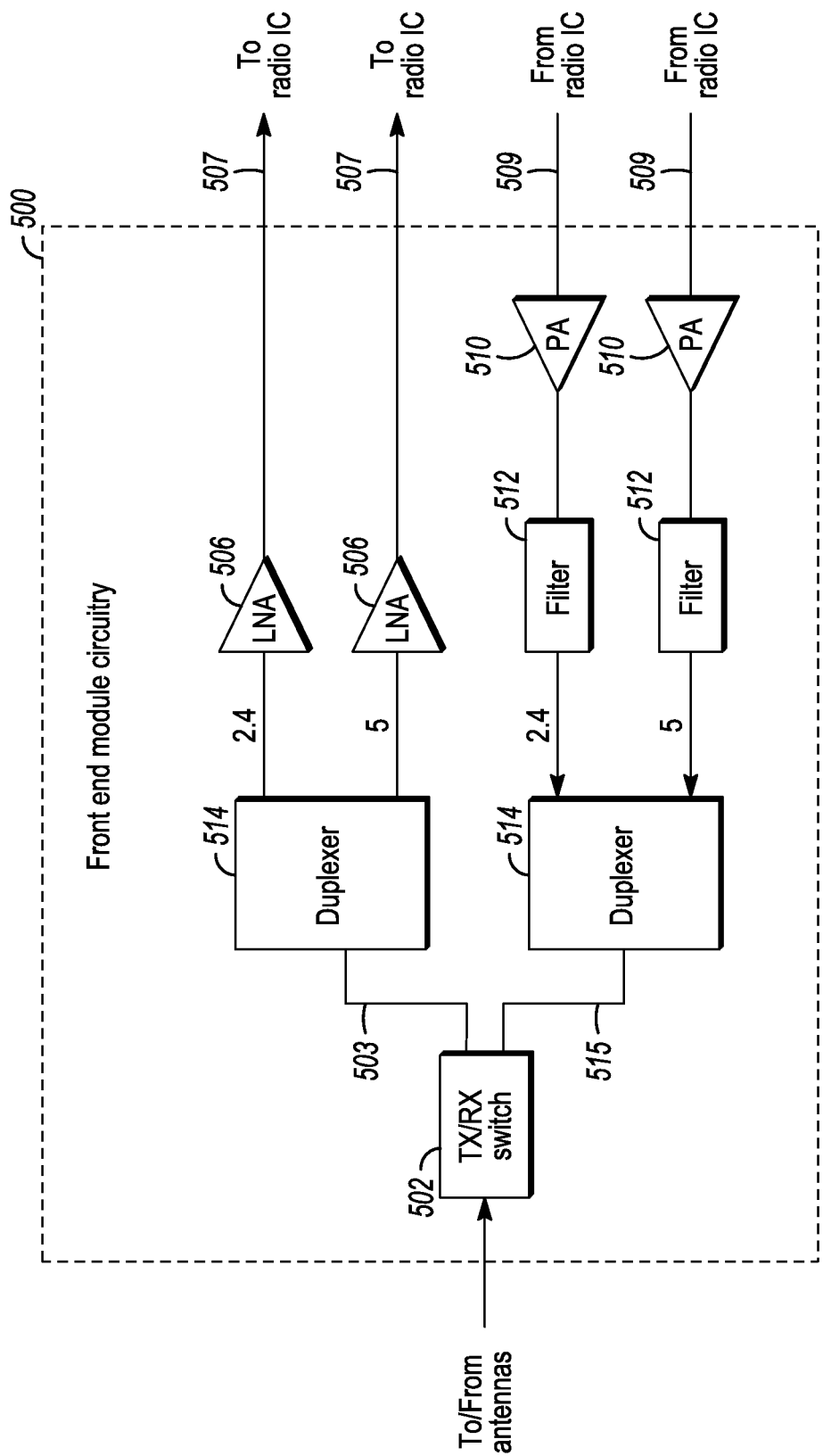
FIG. 5 illustrates a front-end module circuitry for use in the radio architecture of FIG. 4 in accordance with some embodiments.
Figure 6:
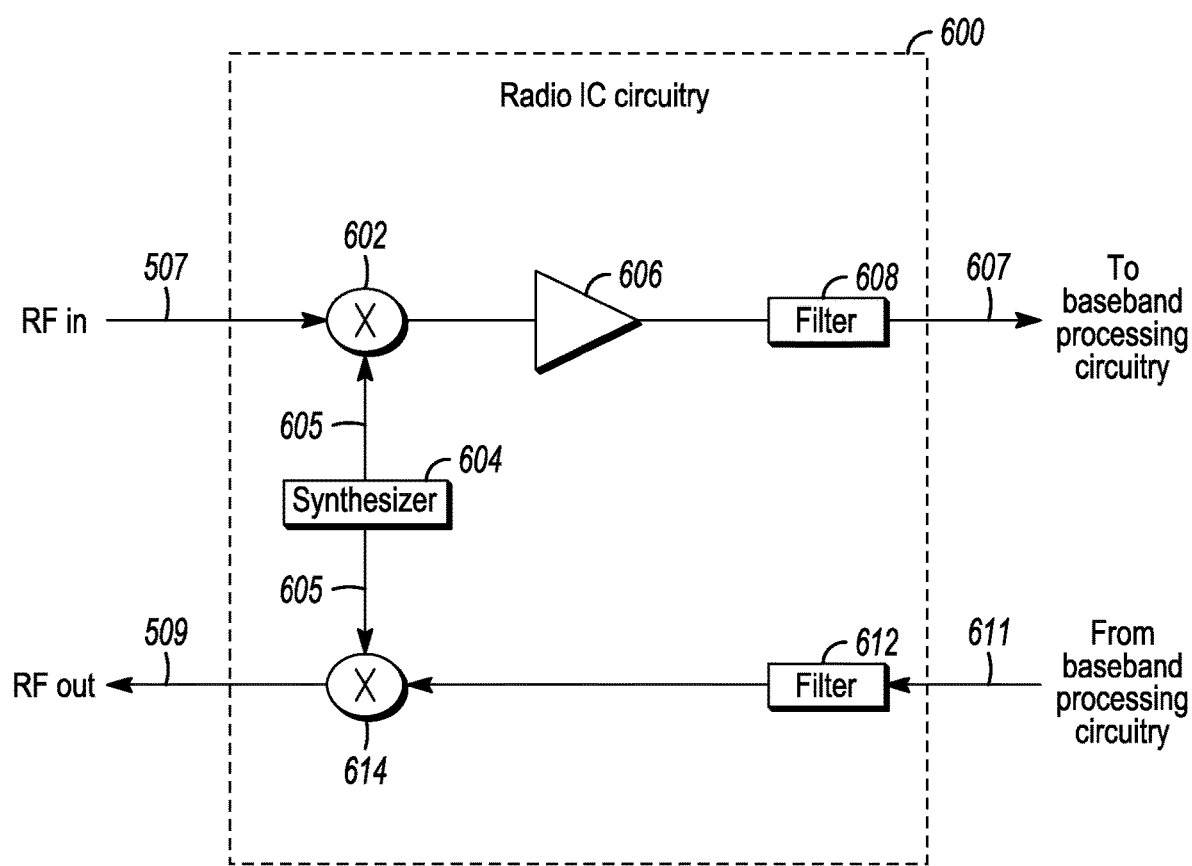
FIG. 6 illustrates a radio IC circuitry for use in the radio architecture of FIG. 4 in accordance with some embodiments.
Figure 7:
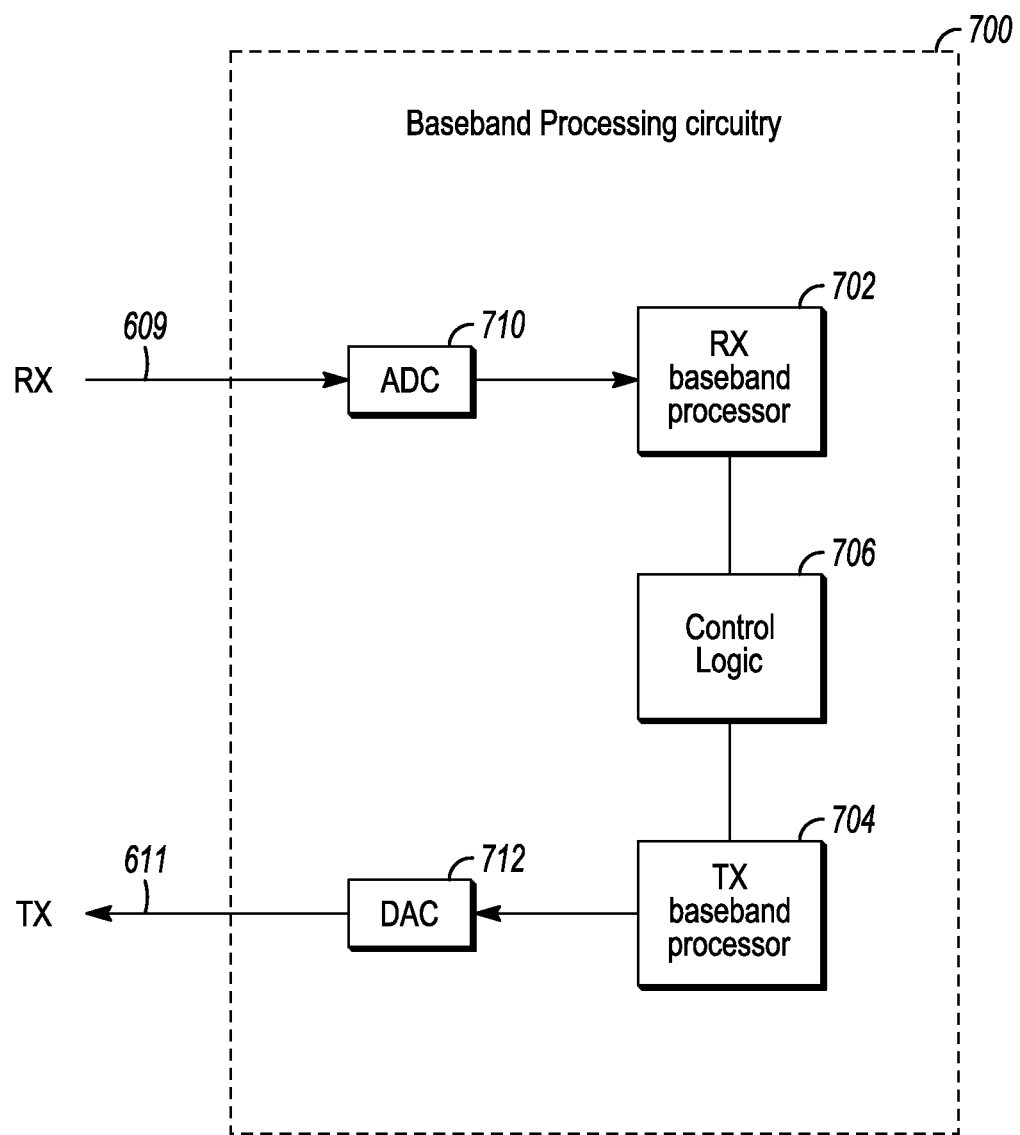
FIG. 7 illustrates a baseband processing circuitry for use in the radio architecture of FIG. 4 in accordance with some embodiments.

It should be noted that the radio architecture 400 and components shown in FIGS. 5-7 support WLAN and BT, but embodiments are not limited to WLAN or BT. In some embodiments, two technologies supported by the radio architecture 400 may or may not include WLAN or BT. Other technologies may be supported. In some embodiments, WLAN and a second technology may be supported. In some embodiments, BT and a second technology may be supported. In some embodiments, two technologies other than WLAN and BT may be supported. In addition, the radio architecture 400 may be extended to support more than two protocols, technologies and/or standards, in some embodiments. Embodiments are also not limited to the frequencies illustrated in FIGS. 4-7.

FEM circuitry 404 may include a WLAN or Wi-Fi FEM circuitry 404a and a Bluetooth (BT) FEM circuitry 404b. The WLAN FEM circuitry 404a may include a receive signal path comprising circuitry configured to operate on WLAN RF signals received from one or more antennas 401, to amplify the received signals and to provide the amplified versions of the received signals to the WLAN radio IC circuitry 406a for further processing. The BT FEM circuitry 404b may include a receive signal path which may include circuitry configured to operate on BT RF signals received from one or more antennas 402, to amplify the received signals and to provide the amplified versions of the received signals to the BT radio IC circuitry 406b for further processing. FEM circuitry 404a may also include a transmit signal path which may include circuitry configured to amplify WLAN signals provided by the radio IC circuitry 406a for wireless transmission by one or more of the antennas 401. In addition, FEM circuitry 404b may also include a transmit signal path which may include circuitry configured to amplify BT signals provided by the radio IC circuitry 406b for wireless transmission by the one or more antennas. In the embodiment of FIG. 4, although FEM 404a and FEM 404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406a and BT radio IC circuitry 406b. The WLAN radio IC circuitry 406a may include a receive signal path which may include circuitry to down-convert WLAN RF signals received from the FEM circuitry 404a and provide baseband signals to WLAN baseband processing circuitry 408a. BT radio IC circuitry 406b may in turn include a receive signal path which may include circuitry to down-convert BT RF signals received from the FEM circuitry 404b and provide baseband signals to BT baseband processing circuitry 408b. WLAN radio IC circuitry 406a may also include a transmit signal path which may include circuitry to up-convert WLAN baseband signals provided by the WLAN baseband processing circuitry 408a and provide WLAN RF output signals to the FEM circuitry 404a for subsequent wireless transmission by the one or more antennas 401. BT radio IC circuitry 406b may also include a transmit signal path which may include circuitry to up-convert BT baseband signals provided by the BT baseband processing circuitry 408b and provide BT RF output signals to the FEM circuitry 404b for subsequent wireless transmission by the one or more antennas 401. In the embodiment of FIG. 4, although radio IC circuitries 406a and 406b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 408 may include a WLAN baseband processing circuitry 408a and a BT baseband processing circuitry 408b. The WLAN baseband processing circuitry 408a may include a memory, such as, for example, a set of RAM arrays in a Fast Fourier Transform or Inverse Fast Fourier Transform block (not shown) of the WLAN baseband processing circuitry 408a. Each of the WLAN baseband circuitry 408a and the BT baseband circuitry 408b may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408a and 408b may further include physical layer (PHY) and medium access control layer (MAC) circuitry, and may further interface with application processor 410 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408a and the BT baseband circuitry 408b to enable use cases requiring WLAN and BT coexistence. In addition, a switch 403 may be provided between the WLAN FEM circuitry 404a and the BT FEM circuitry 404b to allow switching between the WLAN and BT radios according to application needs. In addition, although the antennas 401 are depicted as being respectively connected to the WLAN FEM circuitry 404a and the BT FEM circuitry 404b, embodiments include within their scope the sharing of one or more antennas as between the WLAN and BT FEMs, or the provision of more than one antenna connected to each of FEM 404a or 404b.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard and/or IEEE 802.11az standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz. In some embodiments, the bandwidths may be about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. In some embodiments, the bandwidths may be about 2.16 GHz, 4.32 GHz, 6.48 GHz, 8.72 GHz and/or other suitable value. The scope of the embodiments is not limited with respect to the above center frequencies or bandwidths, however.

FIG. 5 illustrates FEM circuitry 500 in accordance with some embodiments. The FEM circuitry 500 is one example of circuitry that may be suitable for use as the WLAN and/or BT FEM circuitry 404a/404b (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

FIG. 6 illustrates radio IC circuitry 600 in accordance with some embodiments. The radio IC circuitry 600 is one example of circuitry that may be suitable for use as the WLAN or BT radio IC circuitry 406a/406b (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 620 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 604 may be provided by a voltage controlled oscillator (VCO), although that is not a requirement. A divider control input may further be provided by either the baseband processing circuitry 408 (FIG. 4) or the application processor 410 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 410.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency ($f_{LO}$).

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4)

and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408*a*, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with some embodiments, the AP 102 may transmit a trigger frame (TF) that indicates resource units (RUs) that are available for contention based access by STAs 103 for a fine timing measurement (FTM) protocol. The AP 102 may attempt to decode one or more initial fine timing measurement request (iFTMR) frames received in the indicated RUs. The AP 102 may transmit a broadcast acknowledgement (ACK) frame that indicates whether at least one iFTMR frame was decoded. The AP 102 may, for a decoded iFTMR frame: allocate the RU corresponding to the decoded iFTMR frame to a corresponding STA 103 for the FTM protocol; and transmit, in the corresponding RU, an initial fine timing measurement (iFTM) frame that includes an identifier of the corresponding STA 103. These embodiments will be described in more detail below.

Figure 8:
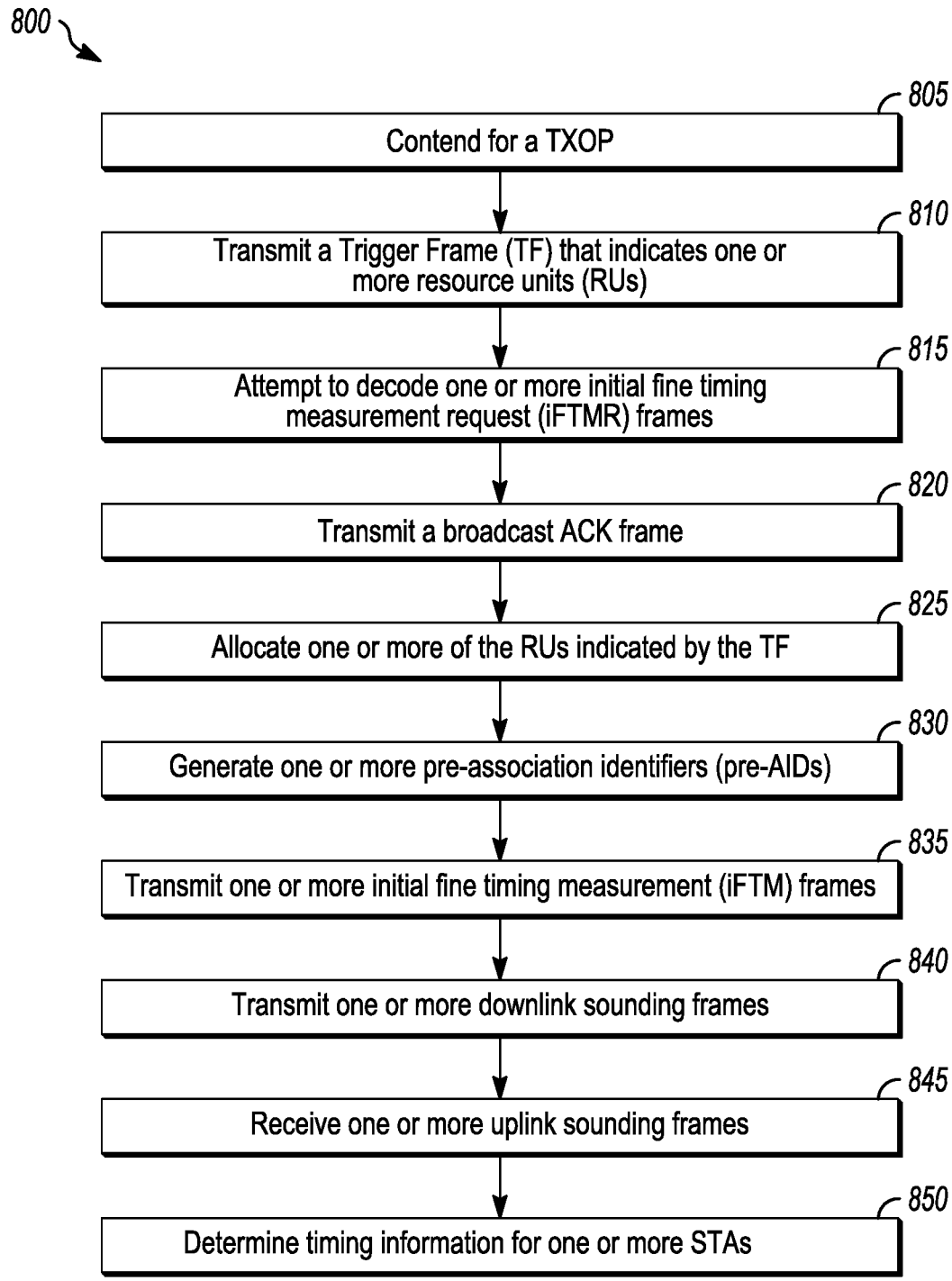
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-10, although it is understood that the method 800 may be practiced with any other suitable systems, interfaces and components.

In some embodiments, an AP 102 may perform one or more operations of the method 800, but embodiments are not limited to performance of the method 800 and/or operations of it by the AP 102. In some embodiments, an STA 103 may perform one or more operations of the method 800 (and/or similar operations). Accordingly, although references may be made to performance of one or more operations of the method 800 by the AP 102 in descriptions herein, it is understood that the STA 103 may perform the same operation(s), similar operation(s) and/or reciprocal operation(s), in some embodiments. In some embodiments, an HE device 104 may perform one or more operations of the method 800 (and/or similar operations). Accordingly, although references may be made to performance of one or more operations of the method 800 by the AP 102 in descriptions herein, it is understood that the HE device 104 may perform the same operation(s), similar operation(s) and/or reciprocal operation(s), in some embodiments In addition, the method 800 and other methods described herein may refer to STAs 103 or APs 102 operating in accordance with an 802.11 standard, protocol and/or specification and/or WLAN standard, protocol and/or specification, in some cases. Embodiments of those methods are not limited to just those STAs 103 or APs 102 and may also be practiced on other devices, such as a User Equipment (UE), an Evolved Node-B (eNB) and/or other device. In addition, the method 800 and other methods described herein may be practiced by wireless devices configured to operate in other suitable types of wireless communication systems, including systems configured to operate according to various Third Generation Partnership Protocol (3GPP) standards, including but not limited to Long Term Evolution (LTE). The method 800 may also be practiced by an apparatus of an STA 103, an apparatus of an AP 102, an apparatus of an HE device 104 and/or an apparatus of another device, in some embodiments.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 805, the AP 102 may contend for a transmission opportunity (TXOP) to obtain access to a channel. In some embodiments, the AP 102 may contend for a TXOP during which the AP 102 is to control access to the channel. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. The AP 102 may transmit and/or receive one or more frames, signals and/or other elements during the period. However, it should be noted that embodiments are not limited to scheduled transmission and/or reception. Embodiments are also not limited to transmission and/or reception in accordance with the exclusive control of the medium. A frame, signal and/or other element may be transmitted/received in contention-based scenarios and/or other scenarios, in some embodiments. Any suitable contention methods, operations and/or techniques may be used, which may or may not be part of a standard. In a non-limiting example, one or more contention methods, operations and/or techniques of an 802.11 standard/protocol and/or W-LAN standard/protocol may be used.

At operation 810, the AP 102 may transmit a trigger frame (TF). In some embodiments, the TF may indicate resource units (RUs) that are available for contention based access by STAs 103 for a fine timing measurement (FTM) protocol. Embodiments are not limited to indication of RUs, as any suitable unit of channel resources (such as sub-carriers, sub-channels and/or other) may be used in some embodiments. In some embodiments, the TF may indicate that STAs 103 are to transmit initial fine timing measurement request (iFTMR) frames. In some embodiments, the TF may be transmitted during the TXOP, although the scope of embodiments is not limited in this respect.

In some embodiments, the TF may be a TF for Service Request (TSR), although the scope of embodiments is not limited in this respect.

In some embodiments, the TF may indicate information to be used by one or more STAs 103 to exchange one or more frames, signals and/or other elements with the AP 102. In some embodiments, the TF may indicate information to be used by the one or more STAs 103 to exchange one or more frames, signals and/or other elements with the AP 102 during the TXOP, although the scope of embodiments is not limited in this respect. Example information of the TF may include, but is not limited to, time resources to be used for transmission and/or reception, channel resources (such as resource units (RUs) and/or other) to be used for transmission and/or reception, identifiers of STAs 103 that are to transmit, identifiers of STAs 103 that are to receive and/or other information. It should be noted that embodiments are not limited to usage of the TF, and some embodiments may not necessarily include the usage of the TF.

In a non-limiting example, the TF may indicate a specific allocation of RUs of the channel to be used by one or more associated STAs 103 for transmission of frames, signals and/or other elements. In another non-limiting example, the TF may indicate one or more RUs of the channel to be used by one or more associated STAs 103 for transmission of frames, signals and/or other elements and may further indicate one or more RUs of the channel to be used by one or more unassociated STAs 103 for transmission of frames, signals and/or other elements. In another non-limiting example, the TF may indicate one or more RUs of the channel to be used by one or more unassociated STAs 103 for transmission of frames, signals and/or other elements. In another non-limiting example, the TF may indicate information related to uplink transmission by associated STAs 103, unassociated STAs 103 or a combination thereof. For instance, the TF may be configurable to allocate at least a first RU to a particular associated STA 103 and may be further configurable to allocate at least a second RU for contention based transmissions by unassociated STAs 103. It should be noted that multiple STAs 103 may be supported. For instance, the TF may allocate one or more RUs to each of multiple STAs 103 for transmissions, in some cases.

At operation 815, the AP 102 may attempt to decode one or more initial fine timing measurement request (iFTMR) frames. In some embodiments, the AP 102 may attempt to decode one or more iFTMR frames in the indicated RUs. In some embodiments, the AP 102 may monitor the indicated RUs and may attempt to decode one or more iFTMR frames based on signals received as part of the monitoring of the indicated RUs. In some embodiments, the AP 102 may attempt to decode the one or more iFTMR frames during the TXOP, although the scope of embodiments is not limited in this respect.

In some embodiments, the AP 102 may attempt to decode the iFTMR frames in accordance with an orthogonal frequency division multiple access (OFDMA) technique. In some embodiments, the AP 102 may attempt to decode the iFTMR frames in accordance with a multi-user (MU) technique. In some embodiments, the AP 102 may attempt to decode the iFTMR frames in accordance with a combination of OFDMA techniques and MU techniques. Embodiments are not limited to usage of OFDMA techniques or to usage of MU techniques, however, as any suitable technique(s) may be used to attempt to decode the iFTMR frames.

At operation 820, the AP 102 may transmit a broadcast acknowledgement (ACK) frame. In some embodiments, the broadcast ACK frame may indicate whether at least one iFTMR frame was decoded. In some embodiments, the broadcast ACK frame may exclude identifiers of STAs 103 from which decoded iFTMRs are received. In some embodiments, the AP 102 may refrain from transmission of multi-user block ACK (M-BA) frames that include the identifiers of the STAs 103 that transmitted the decoded iFTMRs. In some embodiments, the AP 102 may not necessarily transmit an M-BA to indicate information related to decoding of and/or reception of the iFTMR frames. In some embodiments, the AP 102 may transmit the broadcast ACK during the TXOP, although the scope of embodiments is not limited in this respect.

At operation 825, the AP 102 may allocate one or more of the RUs indicated in the TF to one or more STAs 103 for the FTM protocol. At operation 830, the AP 102 may generate one or more pre-association identifiers (pre-AIDs). At operation 835, the AP 102 may transmit one or more initial fine timing measurement (iFTM) frames. In some embodiments, the AP 102 may transmit the iFTM frames during the TXOP, although the scope of embodiments is not limited in this respect.

It should be noted that some embodiments may not necessarily include all operations shown in FIG. 8. For instance, some embodiments of the method 800 may not necessarily include one or more of operations 825-835. In a non-limiting example, the AP 102 may perform operation 835 if at least one iFTMR frame is decoded at operation 815, but may not necessarily perform operation 835 when no iFTMR frames are decoded at operation 815. In another non-limiting example, the AP 102 may perform operation 830 for unassociated STA(s) 103 that transmitted the iFTMR frame(s) that were decoded.

In some embodiments, for a decoded iFTMR frame, the AP 102 may allocate the RU corresponding to the decoded iFTMR frame to a corresponding STA 103 for the FTM protocol. The AP 102 may transmit, in the corresponding RU, an initial fine timing measurement (iFTM) frame that includes an identifier of the corresponding STA 103. In a non-limiting example, the identifier of the corresponding STA 103 may be a medium access control (MAC) address of the corresponding STA 103.

In some embodiments, the decoded iFTMR frame may include a first high efficiency wireless (HEWz) parameters element that includes one or more proposed FTM parameters. It should be noted that embodiments are not limited to usage of the HEWz parameters element. In some embodiments, the proposed FTM parameters may be included in another parameters element of the iFTMR frame. In some embodiments, the proposed FTM parameters may be included in the iFTMR frame, but may not necessarily be part of a parameters element.

In a non-limiting example, one of the proposed FTM parameters may be an FTM response parameter that indicates one of: immediate response, wherein FTM results are to be transmitted by the AP in a current availability window (AW) or in a next AW; and delayed response, wherein FTM results are to be transmitted by the AP in another AW after the next AW. Embodiments are not limited to inclusion of the FTM response parameter described above, as any number of suitable proposed FTM parameters may be used, in addition to or instead of the FTM response parameter. Such parameters may include any suitable information related to the FTM protocol, such as how and/or when fine timing measurements (FTMs) are to be performed.

In some embodiments, the AP 102 may determine whether to accept or reject the proposed FTM parameters. In some embodiments, the iFTM frame may include a second HEWz parameters element that indicates whether the AP 102 accepts the proposed FTM parameters. In some embodiments, the second HEWz parameters element may indicate modified FTM parameters determined by the AP 102. It should be noted that embodiments are not limited to usage of the HEWz parameters element. In some embodiments, such information (including but not limited to the indication of whether the AP 102 accepts or rejects the proposed FTM parameters, the modified FTM parameters and/or other information) may be included in another parameters element of the iFTM frame. In some embodiments, such information may be included in the iFTM frame, but may not necessarily be part of a parameters element.

In some embodiments, the AP 102 may generate a pre-AID for the corresponding STA 103 and may include the pre-AID in the second HEWz parameters element of the iFTM frame. Such operations may be performed under one or more conditions, although the scope of embodiments is not limited in this respect. In a non-limiting example, if the corresponding STA 103 is unassociated with the AP 102 and if the AP 102 accepts the proposed FTM parameters the AP 102 may: generate a pre-AID for the corresponding STA 103; and include the pre-AID in the second HEWz parameters element.

In some embodiments, the AP 102 may encode the iFTM to indicate a failure code in a status field of the second HEWz parameters element. The failure code may indicate that the AP 102 rejects the proposed FTM parameters. Such an operation may be performed under one or more conditions, although the scope of embodiments is not limited in this respect. In a non-limiting example, if the corresponding STA 103 is unassociated with the AP 102 and if the AP 102 rejects the proposed FTM parameters, the AP 102 may encode the iFTM to indicate a failure code in a status field of the second HEWz parameters element.

It should be noted that the operations described above may be extended to cases in which multiple iFTMR frames are decoded. For instance, the AP 102 may, for each decoded iFTMR frame: allocate the RU corresponding to the decoded iFTMR frame to a corresponding STA 103 for the FTM protocol; and transmit an iFTM frame that includes an identifier of the corresponding STA 103. In some cases, including but not limited to those described above, the AP 102 may generate a pre-AID for each STA 103 to which an RU is allocated.

In some embodiments, if the AP 102 decodes an iFTMR frame in a particular RU and the decoded iFTMR frame was transmitted by a particular STA 103, the AP 102 may allocate the particular RU to the particular STA 103 for the FTM protocol. In some cases, including but not limited to those described above, the AP 102 may generate a pre-AID for the particular STA 103.

At operation 840, the AP 102 may transmit one or more downlink sounding frames. In some embodiments, the AP 102 may transmit the downlink sounding frame(s) to STA(s) 103 in RU(s) that have been allocated to those STA(s) 103. At operation 845, the AP 102 may receive one or more uplink sounding frames. In some embodiments, the AP 102 may receive the uplink sounding frame(s) from STA(s) 103 in RU(s) that have been allocated to those STA(s) 103.

At operation 850, the AP 102 may determine timing information for one or more STAs 103. In some embodiments, one or more of operations 840-850 may be performed as part of the FTM protocol, although the scope of embodiments is not limited in this respect.

In some embodiments, the timing information may be determined based at least partly on the downlink sounding frame(s) and/or uplink sounding frame(s), although the scope of embodiments is not limited in this respect. In some embodiments, the timing information may be determined based on other operations, including exchanging of frame(s) other than the sounding frames between the AP 102 and STA(s) 103. In some embodiments, the AP 102 may perform one or more of operations 840-850 for STA(s) 103 for which RU(s) have been allocated for the FTM protocol, although the scope of embodiments is not limited in this respect. In some embodiments, the STA 103 may determine the timing information, in which case operation 850 may not necessarily be performed by the AP 102.

In some embodiments, the AP 102 may transmit, in an RU allocated to an STA 103 for the FTM protocol, a downlink null data packet (NDP) to enable a downlink timing measurement at the STA 103. The downlink NDP may be transmitted as part of the FTM protocol, in some embodiments. The AP 102 may receive, from the STA 103, an uplink NDP in the allocated RU as part of the FTM protocol. The AP 102 may determine an FTM for the STA 103 based at least partly on an arrival time of the downlink NDP at the STA 103 and/or an arrival time of the uplink NDP at the AP 102.

In some embodiments, the AP 102 may determine one or more uplink channel estimates based at least partly on the uplink sounding frames. In some embodiments, the uplink sounding frames may be received from the STAs 103 during the TXOP, although the scope of embodiments is not limited in this respect. In some embodiments, the uplink sounding frames may be multiplexed in accordance with an OFDMA technique, although the scope of embodiments is not limited in this respect. In some embodiments, the AP 102 may determine per-STA arrival times of the uplink sounding frames. In some embodiments, the uplink sounding frames may include one or more uplink NDPs. In some embodiments, the uplink sounding frames may be uplink NDPs. In some embodiments, the uplink sounding frames may be based on one or more uplink NDPs.

In a non-limiting example, the AP 102 may determine the arrival times of the uplink sounding frames based at least partly on one or more correlation operations between the uplink sounding frames and one or more predetermined symbol patterns. Additional operation(s) may be used, in some embodiments, in addition to or instead of the correlation operation(s).

In some embodiments, the AP 102 may transmit one or more downlink sounding frames. In some embodiments, the downlink sounding frames may be transmitted during the TXOP, although the scope of embodiments is not limited in this respect. In some embodiments, the downlink sounding frames may be multiplexed in accordance with an OFDMA technique, although the scope of embodiments is not limited in this respect. In some embodiments, the downlink sounding frames may include one or more downlink NDPs. In some embodiments, the downlink sounding frames may be downlink NDPs. In some embodiments, the downlink sounding frames may be based on one or more downlink NDPs.

In a non-limiting example, the AP 102 and an STA 103 may exchange an uplink sounding frame and a downlink sounding frame. Timing information of the STA 103 may be determined (by the AP 102 or by the STA 103) based on one or more of: an arrival time of the uplink sounding frame at the AP 102, an arrival time of the downlink sounding frame at the STA 103, a departure time of the uplink sounding frame from the STA 103 and a departure time of the downlink sounding frame from the AP 102. For instance, a round trip time (RTT) measurement may be based on a first difference between the arrival time of the downlink sounding frame at the STA 103 and a departure time of the downlink sounding frame from the AP 102. The RTT may be further based on a second difference between an arrival time of the uplink sounding frame at the AP 102 and a departure time of the uplink sounding frame from the STA 103.

It should be noted that in the example above and in other operations described herein, timing information (such as arrival times, departure times, time differences and/or other) may be given in any suitable unit. For instance, microseconds, milliseconds, and/or other unit may be used. In some embodiments, a suitable reference time (such as a system reference time, a reference time of the STA 103, a reference time of the AP 102 and/or other) may be used to indicate the departure time, arrival time and/or difference between times.

In some embodiments, sounding waveforms may be included in the uplink sounding frames and/or downlink sounding frames. The sounding waveforms may be based on training symbols, in some cases, although the scope of embodiments is not limited in this respect. Uplink channel state information (CSI) may be determined at the AP 102 based on sounding waveform(s) transmitted by the STAs 103, in some embodiments. Downlink channel state information (CSI) may be determined at an STA 103 based on sounding waveform(s) transmitted by the AP 102, in some embodiments.

In some embodiments, the AP 102 may perform one or more operations as part of a FTM protocol for determination of timing information, location information and/or other information for one or more STAs 103. For instance, the AP 102 may transmit, as part of the FTM protocol, one or more of: the TF, the broadcast ACK, the iFTM frame(s), the downlink sounding frame(s) and/or other element(s) as part of the FTM protocol. The AP 102 may receive, as part of the FTM protocol, one or more of: the iFTMR frame(s), the downlink sounding frame(s) and/or other element(s).

In some embodiments, an apparatus of an AP 102 may comprise memory. The memory may be configurable to store one or more decoded iFTMR frames. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the TF, encoding of the broadcast ACK frame and/or attempting to decode iFTMR frames. The apparatus of the AP 102 may include a transceiver. In some embodiments, the transceiver may receive one or more elements (such as the uplink sounding frames and/or other). In some embodiments, the transceiver may transmit one or more elements (such as the TF, the broadcast ACK frame and/or other). The transceiver may transmit and/or receive other frames, messages and/or other elements, in some embodiments.

Figure 9:
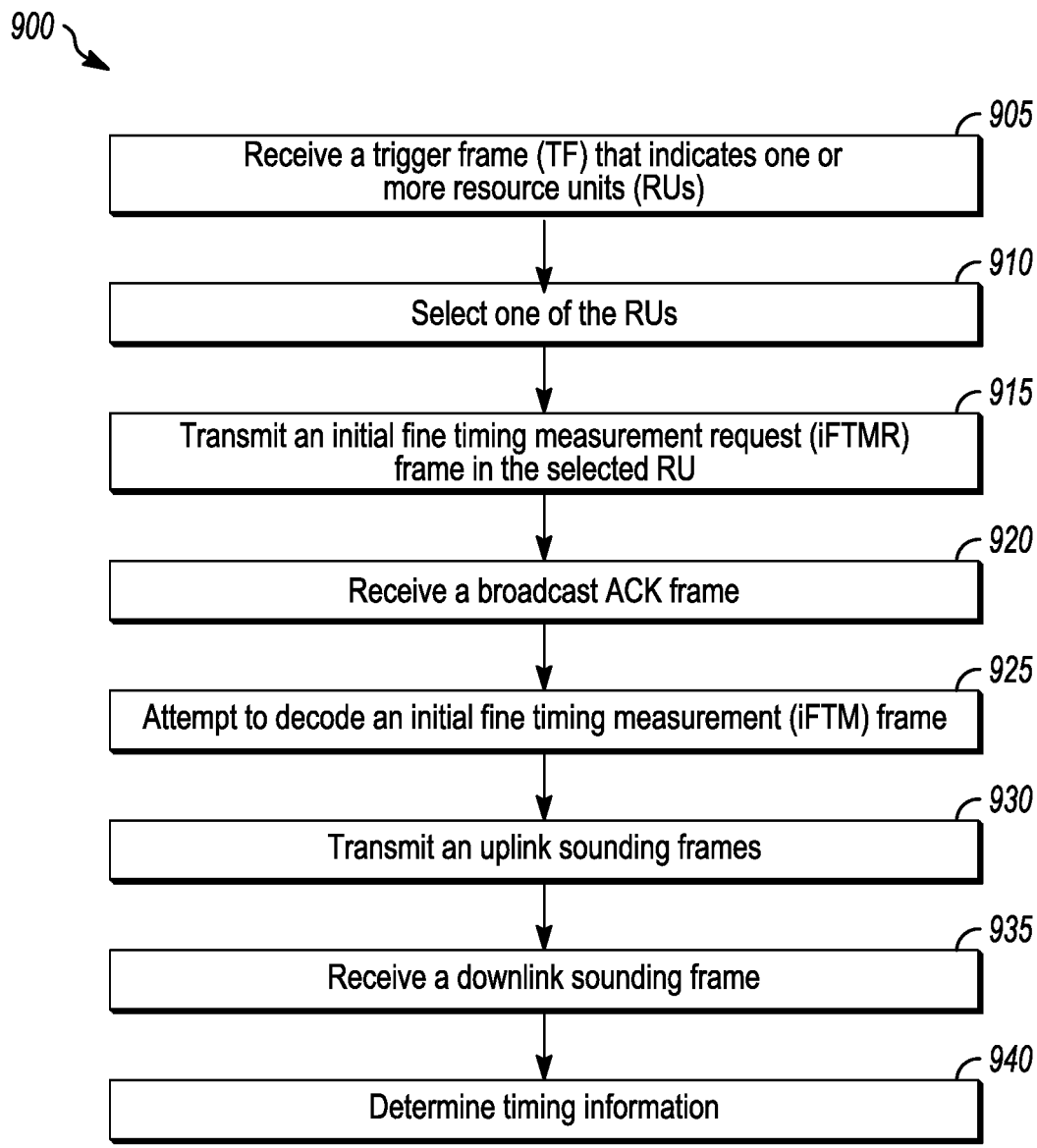
FIG. 9 illustrates the operation of another method of communication in accordance with some embodiments.

FIG. 9 illustrates the operation of another method of communication in accordance with some embodiments. Embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to any of FIGS. 1-10, although it is understood that the method 900 may be practiced with any other suitable systems, interfaces and components. In addition, embodiments of the method 900 may be applicable to APs 102, STAs 103, HE devices 104, UEs, eNBs and/or other wireless or mobile devices. The method 1300 may also be applicable to an apparatus of an AP 102, STA 103, HE device 104 and/or other device, in some embodiments.

In some embodiments, an STA 103 may perform one or more operations of the method 900, but embodiments are not limited to performance of the method 900 and/or operations of it by the STA 103. In some embodiments, the AP 102 may perform one or more operations of the method 900 (and/or similar operations). Accordingly, although references may be made to performance of one or more operations of the method 900 by the STA 103 in descriptions herein, it is understood that the AP 102 may perform the same operation(s), similar operation(s) and/or reciprocal operation(s), in some embodiments. In some embodiments, an HE device 104 may perform one or more operations of the method 900 (and/or similar operations). Accordingly, although references may be made to performance of one or more operations of the method 900 by the STA 103 in descriptions herein, it is understood that the HE device 104 may perform the same operation(s), similar operation(s) and/or reciprocal operation(s), in some embodiments.

It should be noted that the method 900 may be practiced by an STA 103 and may include exchanging of elements, such as frames, signals, messages and/or other elements with an AP 102. The method 800 may be practiced by an AP 102 and may include exchanging of elements, such as frames, signals, messages and/or other elements with an STA 103. In some cases, operations and techniques described as part of the method 800 may be relevant to the method 900. In some cases, operations and techniques described as part of the method 900 may be relevant to the method 800. In addition, embodiments of the method 900 may include one or more operations that may be the same as, similar to or reciprocal to one or more operations of the method 800 (and/or other operation(s) described herein). For instance, an operation of the method 900 may include reception of an element (such as a frame, block, message and/or other) by an STA 103 and the method 800 may include transmission of a same or similar element by the AP 102. In addition, one or more operations included in the method 800 may be the same as, or similar to, one of more operations included in the method 900.

In addition, previous discussion of various techniques, operations and/or concepts may be applicable to the method 900, in some cases, including TF, TSR, FTM protocol, iFTMR frames, iFTM frames, broadcast ACK frame, pre-AID, timing information, location information, downlink sounding frame, uplink sounding frame, channel estimation, RTT, arrival time, departure time, NDP, contention for access, TXOP, OFDMA transmission, OFDMA reception, MU transmission, MU reception and/or others.

At operation 905, the STA 103 may receive a TF that indicates one or more RUs. In some embodiments, the TF may indicate one or more resource units (RUs) that are available for contention based access by STAs 103 for a fine timing measurement (FTM) protocol with an AP 102. At operation 910, the STA 103 may select one of the RUs.

At operation 915, the STA 103 may transmit an initial fine timing measurement request (iFTMR) frame. In some embodiments, the STA 103 may transmit the iFTMR frame in the selected RU, although the scope of embodiments is not limited in this respect. In some embodiments, the STA 103 may transmit the iFTMR frame in accordance with an orthogonal frequency division multiple access (OFDMA) technique. In some embodiments, the STA 103 may transmit the iFTMR frame in accordance with a multi-user (MU) technique. In some embodiments, the STA 103 may transmit the iFTMR frame in accordance with a combination of OFDMA techniques and MU techniques. Embodiments are not limited to usage of OFDMA techniques or to usage of MU techniques, however, as any suitable technique(s) may be used to attempt to transmit the iFTMR frame.

At operation 920, the STA 103 may receive a broadcast ACK frame. In some embodiments, the broadcast ACK may indicate whether at least one iFTMR frame was decoded by the AP 102. In some embodiments, the broadcast ACK may not necessarily indicate how many iFTMR frames were decoded, the STA(s) 103 from which iFTMR frames were received/decoded and/or other information.

At operation 925, the STA 103 may attempt to decode an initial fine timing measurement (iFTM) frame in the selected RU. In some embodiments, the STA 103 may perform operation 925 if the broadcast ACK indicates that at least one iFTMR frame was decoded by the AP 102. The STA 103 may not necessarily perform operation 925 if the broadcast ACK indicates that the AP 102 did not decode iFTMR frames, in some embodiments. In some embodiments, the STA 103 may determine, based on a MAC address and/or other identifier of the iFTM frame, if the selected RU is allocated to the STA 103. For instance, the STA 103 may compare a MAC address of the STA 103 with the MAC address included in the iFTM frame. In some embodiments, the AP 102 may indicate that the RU is allocated to the STA 103 by inclusion of the MAC address of the STA 103 in the iFTM frame transmitted, by the AP 102, in the selected RU.

At operation 930, the STA 103 may transmit an uplink sounding frame. In some embodiments, the STA 103 may transmit the uplink sounding frame in the selected RU if the iFTM frame (received at operation 925) indicates that the RU is allocated to the STA 103. In some embodiments, the STA 103 may transmit the uplink sounding frame in the selected RU if the STA 103 determines that the RU is allocated to the STA 103.

At operation 935, the STA 103 may receive a downlink sounding frame. In some embodiments, the STA 103 may receive the downlink sounding frame in the selected RU if the iFTM frame (received at operation 925) indicates that the RU is allocated to the STA 103. In some embodiments, the STA 103 may receive the downlink sounding frame in the selected RU if the STA 103 determines that the RU is allocated to the STA 103.

In some embodiments, the STA 103 may perform either or both of operations 935-940 in accordance with an OFDMA technique, a MU technique or a combination thereof. Embodiments are not limited to usage of OFDMA techniques or MU techniques, however, as any suitable technique(s) may be used for operations 935-940.

Figure 10:
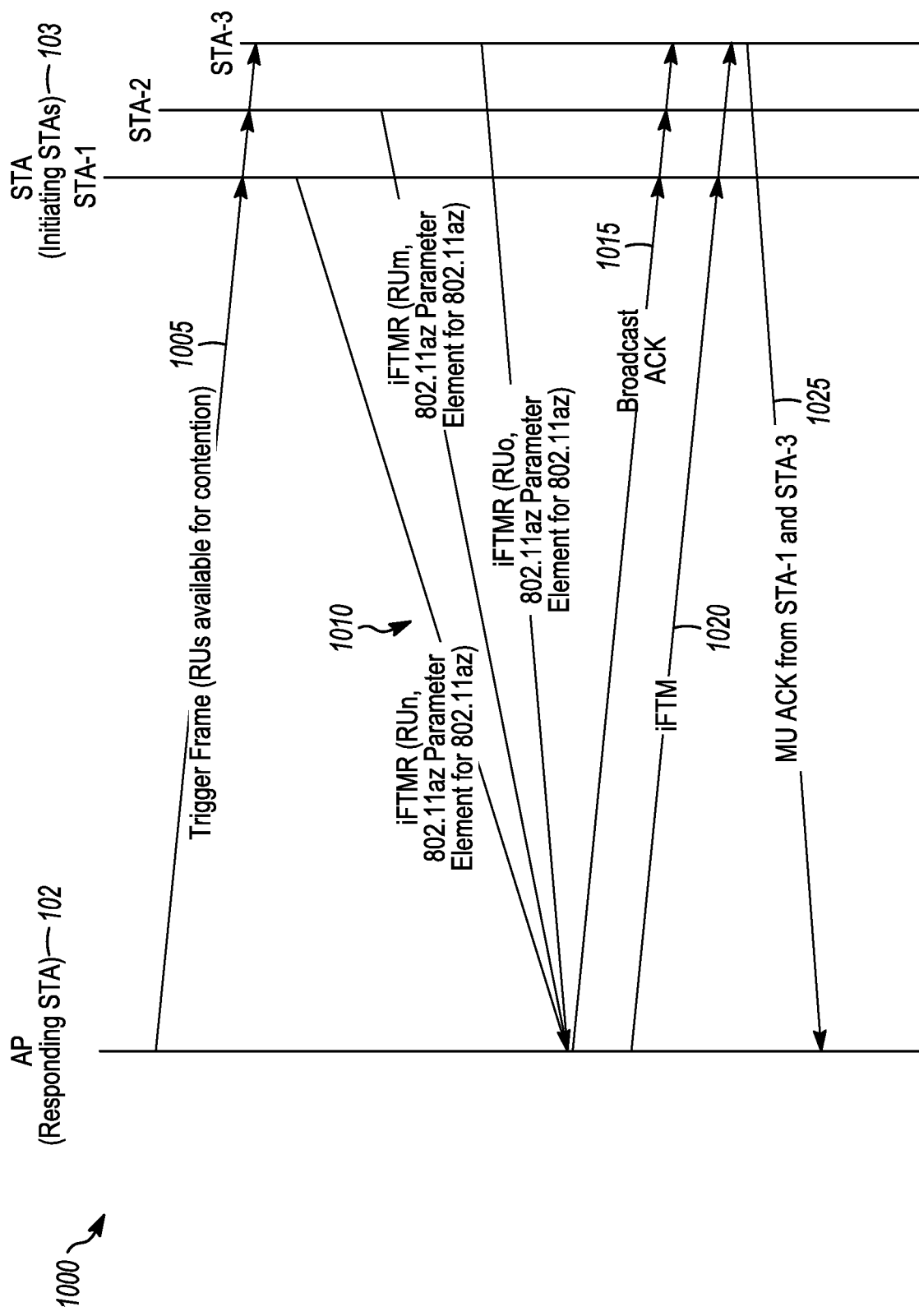
FIG. 10 illustrates example frames that may be exchanged in accordance with some embodiments.

FIG. 10 illustrates example frames that may be exchanged in accordance with some embodiments. It should be noted that the examples shown in FIG. 10 may illustrate some or all of the concepts and techniques described herein in some cases, but embodiments are not limited by the examples of FIG. 10. For instance, embodiments are not limited by the name, number, type, size, ordering, arrangement and/or other aspects of the frames, signals, fields, data blocks, operations, time resources and other elements as shown in FIG. 10. Although some of the elements shown in the examples of FIG. 10 may be included in a standard, such as 802.11, 802.11ax, 802.11az, WLAN and/or other, embodiments are not limited to usage of such elements that are included in standards.

Referring to FIG. 10, the AP 102 may transmit the TF at operation 1005. The TF may indicate one or more RUs available for contention by the STAs 103. The STAs 103 may transmit iFTMR frames at operation 1010. The AP 102 may transmit a broadcast ACK at operation 1015. The AP 102 may transmit one or more iFTM frames at operation 1020. At operation 1025, one or more of the STAs 103 may transmit a multi-user ACK frame. In this example, the STAs 103 denoted as STA #1 and STA #3 have been allocated RUs, and therefore they transmit the MU-ACK frame. In this example, the STA 103 denoted as STA #2 was not allocated an RU, so it does not transmit the MU-ACK frame.

In a non-limiting example, the iFTMR frame from STA #2 may not have been decoded at the AP 102 for any suitable reason(s), including insufficient signal strength, interference, collision and/or other. For instance, a collision may have occurred in the RU selected by STA #2.

In some embodiments, a method to allocate resources and to signal the allocation may be performed. The method may be performed, in some cases, to facilitate execution of a ranging protocol. In a non-limiting example, an 802.11ax random resource allocation protocol may be used. In the 802.11ax protocol, either OFDMA or MU-MIMO resource units (RUs) may be allocated by the AP 102 to STAs 103. The STAs 103 may be identified by Association IDs (AIDs), in some embodiments. The STAs 103 may be indicated in a TF that solicits UL PPDUs, in some embodiments. One or more RUs may be identified by a value (such as a generic AID value of 0) in the TF, and may be allocated for UL OFDMA-based random access (RA). These RUs may be intended for acquisition by contending STAs 103 in order to communicate with the AP 102. The STAs 103 that contend and acquire ownership of the RUs may or may not be associated with the AP 102.

In some embodiments, the AP 102 may allocate one or more RUs for UL OFDMA-based random access and may indicate those RUs (for instance, using an AID of 0) in a TF. In a non-limiting example, a Trigger frame for Service Request (TSR) may be used. In some cases, the TSR may be used for ranging and/or measurement operations. The STAs 103 that receive the TSR may contend for resources using one or more contention techniques, including but not limited to techniques used in an 802.11ax HE UL OFDMA-based Random Access Procedure. After successful acquisition of resources, an STA 103 may transmit an Initial Fine Timing Measurement Request (iFTMR) frame to the AP 102. In some embodiments, one or more STAs 103 may transmit iFTMR frames in a Multi User (MU) mode (for instance, in an MU PPDU).

In some embodiments, the AP 102 may receive one or more iFTMR frames. The iFTMR frames may be received simultaneously, in some embodiments, although the scope of embodiments is not limited in this respect. After reception of one or more iFTMR frames, the AP 102 may transmit an ACK frame in a broadcast mode. In a non-limiting example, a broadcast ACK may be used. In some embodiments, the AP 102 may transmit the ACK frame after a predetermined time duration with respect to reception of the iFTMR frame(s). In a non-limiting example, the predetermined time duration may be a short inter-frame spacing (SIFS). Embodiments are not limited to usage of the SIFS for the predetermined time duration. Any suitable values, which may or may not be included in a standard, may be used for the time duration.

In some embodiments, after transmission of the ACK frame, the AP 102 may transmit an initial Fine Timing Measurement (iFTM) frame. In some embodiments, the AP 102 may transmit the iFTM frame after a predetermined time duration with respect to transmission of the ACK frame. In a non-limiting example, the predetermined time duration may be a short inter-frame spacing (SIFS). Embodiments are not limited to usage of the SIFS for the predetermined time duration. Any suitable values, which may or may not be included in a standard, may be used for the time duration.

In some embodiments, for an unassociated STA 103 that has sent an iFTMR frame, the iFTM frame may include an unassociated ID (UID) and a MAC address. In some cases, the UID may enable an STA 103 to parse and/or decode information included in the iFTM frame. In some cases, the MAC address may uniquely identify the STA 103. In some embodiments, for an associated STA 103 that has sent an iFTMR frame, it may not be necessary for the AP 102 to include information for the STA 103 in the iFTM frame. For instance, as part of association, the AP 102 may assign the STA 103 an Association ID (AID) which may be used to identify the STA 103 as an intended recipient of a transmission from the AP 102. In some embodiments, a pre-Association ID (pre-AID) for an unassociated STA 103 and a MAC address of the unassociated STA 103 may be included in the iFTM. In a non-limiting example, an AID may be included in a high efficiency (HE) signal field (such as an HE-SIG-B field) of an HE PLCP header of the iFTM frame. In some embodiments, after the exchange of the frames described above, a pre-AID may be assigned to each of the unassociated STAs 103 from which the AP 102 has received an iFTMR frame.

Referring to FIG. 10, in the example scenario 1000, the AP 102 may allocate some resources (such as RUs and/or other) based on one or more factors (including but not limited to operating conditions). The AP 102 may transmit a TF that announces resources (RUm, RUn and RUo in the example 1000). The STAs 103 (labeled STA-1, STA-2 and STA-3) may receive the TF. The STAs 103 may use a random access procedure (including but not limited to a UL OFDMA-based random access procedure included in an 802.11ax standard) to acquire RUn, RUm and RUo, respectively. STA-1, STA-2 and STA-3 may indicate acquisition of the corresponding resources by transmitting an iFTMR frame to the AP 102. In some embodiments, an MU mode may be used, although the scope of embodiments is not limited in this respect.

In some embodiments, an iFTMR frame may include an information element (including but not limited to an HEWz Parameters Element). For instance, for a particular STA 103, the HEWz Parameters Element may define one or more parameters that the particular STA 103 intends to use upon successful negotiation with the AP 102.

In some embodiments, the AP 102 may determine if the parameters in the HEWz Parameters Elements from a particular STA 103 are acceptable for the AP 102 to use under current (and expected future) operating conditions. This operation may be performed multiple times, in some cases. For instance, if multiple STAs 103 transmit IFTMR frames, the AP 102 may perform this operation for each of those STAs 103. The AP 102 may transmit an ACK frame in broadcast mode. In some cases, the AP 102 may transmit the ACK frame after a time duration with respect to reception of the iFTMR frame(s) (such as an SIFS and/or other).

If the HEWz parameters from the particular STA 103 are acceptable, the AP 102 may perform one or more of the following operations. The AP 102 may assign a pre-AID to the particular STA 103 if the particular STA 103 is unassociated. The AP 102 may transmit an iFTM to the particular STA 103. The iFTM frame may be in broadcast mode or in MU mode (using RUs). The iFTM may include an HEWz Parameters Element which may include the assigned pre-AID for the particular STA 103 and a MAC address of the particular STA 103. The AP 102 and the particular STA 103 may subsequently communicate with each other using the assigned pre-AID. The assigned pre-AID may uniquely identify the particular STA 103 to the AP 102, even though the particular STA 103 is not associated with the AP 102. It should be noted that one or more of the above operations may be performed multiple times, in some cases. For instance, if the AP 102 determines that the HEWz parameters from multiple STAs 103 are acceptable, one or more of the above operations may be performed for each of those STAs 103.

If the HEWz parameters from a particular STA 103 are not acceptable to the AP 102, the AP 102 may transmit an iFTM frame to the particular STA 103 to indicate this information. In a non-limiting example, a failure code in a Status field of an HEWz parameters element of the iFTM frame may indicate this information. The iFTM frame transmitted to the particular STA 103 may not necessarily include a pre-AID in the HEWz parameters element. It should be noted that one or more of the above operations may be performed multiple times, in some cases. For instance, if multiple STAs 103 transmit IFTMR frames, the AP 102 may perform one or more of the above operations for each of those STAs 103. For instance, if the AP 102 determines that the HEWz parameters from multiple STAs 103 are not acceptable, one or more of the above operations may be performed for each of those STAs 103.

In some embodiments, the AP 102 may not necessarily transmit a multi-user block ACK (M-BA) for the iFTMR frames. In some embodiments, the AP 102 may refrain from transmission of M-BAs for the iFTMR frames. In some embodiments, the AP 102 may transmit a broadcast ACK for the iFTMR frames. In a non-limiting example, a predetermined value may be included in a receiver address (RA) field of the broadcast ACK. Any suitable value may be used. For instance, a hexadecimal value of FF:FF:FF:FF:FF:FF may be used.

In some embodiments, the broadcast ACK may not necessarily include information on which of the received iFTMR frames are acknowledged. In some embodiments, the AP 102 may attempt to receive iFTMR frames during a time period (such as a time period after the transmission of the TF in which the AP 102 expects the STAs 103 to transmit the iFTMR frames in response to the TF). The broadcast ACK may indicate whether at least one iFTMR frame is successfully received during the time period. In a non-limiting example, the broadcast ACK may indicate one of two cases: a first case in which at least one iFTMR frame is successfully received during the time period; and a second case in which the AP 102 does not successfully receive any iFTMR frames during the time period.

In some embodiments, if the AP 102 does not transmit an M-BA for the iFTMR frames, an unassociated STA 103 may be unaware of a UID assigned to it. Accordingly, a mechanism may be used to enable the unassociated STA 103 to determine a particular RU that includes information for the unassociated STA 103 within an HEWz Parameters element. In some embodiments, the AP 102 may use a same RU (such as a size and location within a 20 MHz channel) on which the STA 103 has sent its UL PPDU. In other words, the AP 102 may include information for the unassociated STA 103 within the HEWz Parameters element in the RU on which the AP 102 has received an UL PPDU. Hence, an STA 103 that has acquired an RU for its UL transmission may decode information in a same RU that it had acquired. An HE-SIG-B field within the iFTM frame may include either the pre-AID or an AID corresponding to the RU on which the AP 102 has received UL PPDUs from STAs 103.

In Example 1, an apparatus of an access point (AP) may comprise memory. The apparatus may further comprise processing circuitry. The processing circuitry may be configured to encode, for transmission, a trigger frame (TF) that indicates resource units (RUs) that are available for contention based access by stations (STAs) for a fine timing measurement (FTM) protocol. The processing circuitry may be further configured to attempt to decode one or more initial fine timing measurement request (iFTMR) frames received in the indicated RUs. The processing circuitry may be further configured to encode, for transmission, a broadcast acknowledgement (ACK) frame that indicates whether at least one iFTMR frame was decoded. The processing circuitry may be further configured to, for a decoded iFTMR frame: allocate the RU corresponding to the decoded iFTMR frame to a corresponding STA for the FTM protocol; and encode, for transmission in the corresponding RU, an initial fine timing measurement (iFTM) frame that includes an identifier of the corresponding STA.

In Example 2, the subject matter of Example 1, wherein the processing circuitry may be further configured to encode, for transmission in the corresponding RU as part of the FTM protocol, a downlink null data packet (NDP) to enable a downlink timing measurement at the corresponding STA. The processing circuitry may be further configured to decode an uplink NDP received from the corresponding STA in the corresponding RU as part of the FTM protocol. The processing circuitry may be further configured to determine an FTM for the corresponding STA based at least partly on an arrival time of the downlink NDP at the corresponding STA or an arrival time of the uplink NDP at the AP.

In Example 3, the subject matter of one or any combination of Examples 1-2, wherein the identifier of the corresponding STA may be a medium access control (MAC) address of the corresponding STA.

In Example 4, the subject matter of one or any combination of Examples 1-3, wherein the broadcast ACK frame may exclude identifiers of STAs from which decoded iFTMRs are received.

In Example 5, the subject matter of one or any combination of Examples 1-4, wherein the processing circuitry may be further configured to refrain from transmission of multi-user block ACK (M-BA) frames that include the identifiers of the STAs that transmitted the decoded iFTMRs.

In Example 6, the subject matter of one or any combination of Examples 1-5, wherein the decoded iFTMR may include a first high efficiency wireless (HEW) parameters element that includes one or more proposed FTM parameters. The iFTM frame may include a second HEW parameters element that indicates whether the AP accepts the proposed FTM parameters.

In Example 7, the subject matter of one or any combination of Examples 1-6, wherein the processing circuitry may be further configured to, if the corresponding STA is unassociated with the AP and if the AP accepts the proposed FTM parameters: generate a pre-association identifier (pre-AID) for the corresponding STA; and encode the iFTM to include the pre-AID in the second HEWz parameters element.

In Example 8, the subject matter of one or any combination of Examples 1-7, wherein the processing circuitry may be further configured to, if the corresponding STA is unassociated with the AP and if the AP rejects the proposed FTM parameters: encode the iFTM to indicate a failure code in a status field of the second HEW parameters element, wherein the failure code indicates that the AP rejects the proposed FTM parameters.

In Example 9, the subject matter of one or any combination of Examples 1-8, wherein the proposed FTM parameters may include an FTM response parameter that indicates one of: immediate response, wherein FTM results are to be transmitted by the AP in a current availability window (AW)

or in a next AW; and delayed response, wherein FTM results are to be transmitted by the AP in another AW after the next AW.

In Example 10, the subject matter of one or any combination of Examples 1-9, wherein the processing circuitry may be further configured to attempt to decode the iFTMR frames in accordance with an orthogonal frequency division multiple access (OFDMA) technique or a multi-user (MU) technique.

In Example 11, the subject matter of one or any combination of Examples 1-10, wherein the TF may be a TF for Service Request (TSR).

In Example 12, the subject matter of one or any combination of Examples 1-11, wherein the processing circuitry may be further configured to store the decoded iFTMR from the corresponding STA in the memory.

In Example 13, the subject matter of one or any combination of Examples 1-12, wherein the apparatus may further include a transceiver to transmit the TF and the broadcast ACK frame; and receive the iFTMR frames.

In Example 14, the subject matter of one or any combination of Examples 1-13, wherein the processing circuitry may include a baseband processor to encode the TF and the broadcast ACK frame; and attempt to decode the iFTMR frames.

In Example 15, a computer-readable storage medium may store instructions for execution by one or more processors to perform operations for communication by a station (STA). The operations may configure the one or more processors to decode a trigger frame (TF) that indicates resource units (RUs) that are available for contention based access by STAs for a fine timing measurement (FTM) protocol with an access point (AP). The operations may further configure the one or more processors to select one of the RUs. The operations may further configure the one or more processors to encode, for transmission in the selected RU, an initial fine timing measurement request (iFTMR) frame. The operations may further configure the one or more processors to decode a broadcast acknowledgement (ACK) frame that indicates whether at least one iFTMR frame was decoded by the AP. The operations may further configure the one or more processors to, if the broadcast ACK frame indicates that at least one iFTMR frame was decoded by the AP: decode an initial fine timing measurement (iFTM) frame in the selected RU; and determine, based on a comparison between a medium access control (MAC) address of the STA and a MAC address included in the iFTM frame, whether the selected RU is allocated to the STA for the FTM protocol.

In Example 16, the subject matter of Example 15, wherein the operations may further configure the one or more processors to, if it is determined that the selected RU is allocated to the STA for the FTM protocol: encode, for transmission in the selected RU as part of the FTM protocol, an uplink null data packet (NDP) to enable an uplink timing measurement at the AP; decode a downlink NDP received from the AP in the selected RU as part of the FTM protocol; and determine an FTM based at least partly on an arrival time of the downlink NDP at the STA or an arrival time of the uplink NDP at the AP.

In Example 17, the subject matter of one or any combination of Examples 15-16, wherein the operations may further configure the one or more processors to encode the iFTMR frame for transmission in accordance with an orthogonal frequency division multiple access (OFDMA) technique or a multi-user (MU) technique.

In Example 18, a method of communication at an access point (AP) may comprise encoding, for transmission, a trigger frame (TF) that indicates resource units (RUs) that are available for contention based access by stations (STAs) for a fine timing measurement (FTM) protocol. The method may further comprise attempting to decode one or more initial fine timing measurement request (iFTMR) frames received in the indicated RUs. The method may further comprise encoding, for transmission, a broadcast acknowledgement (ACK) frame that indicates whether at least one iFTMR frame was decoded. The method may further comprise, for a decoded iFTMR frame: allocating the RU corresponding to the decoded iFTMR frame to a corresponding STA for the FTM protocol; and encoding, for transmission in the corresponding RU, an initial fine timing measurement (iFTM) frame that includes an identifier of the corresponding STA.

In Example 19, the subject matter of Example 18, wherein the method may further comprise encoding, for transmission in the corresponding RU as part of the FTM protocol, a downlink null data packet (NDP) to enable a downlink timing measurement at the corresponding STA. The method may further comprise decoding an uplink NDP received from the corresponding STA in the corresponding RU as part of the FTM protocol. The method may further comprise determining an FTM for the corresponding STA based at least partly on an arrival time of the downlink NDP at the corresponding STA or an arrival time of the uplink NDP at the AP.

In Example 20, an apparatus of a station (STA) may comprise means for decoding a trigger frame (TF) that indicates resource units (RUs) that are available for contention based access by STAs for a fine timing measurement (FTM) protocol with an access point (AP). The apparatus may further comprise means for selecting one of the RUs. The apparatus may further comprise means for encoding, for transmission in the selected RU, an initial fine timing measurement request (iFTMR) frame. The apparatus may further comprise means for decoding a broadcast acknowledgement (ACK) frame that indicates whether at least one iFTMR frame was decoded by the AP. The apparatus may further comprise means for, if the broadcast ACK frame indicates that at least one iFTMR frame was decoded by the AP: decoding an initial fine timing measurement (iFTM) frame in the selected RU; and determining, based on a comparison between a medium access control (MAC) address of the STA and a MAC address included in the iFTM frame, whether the selected RU is allocated to the STA for the FTM protocol.

In Example 21, the subject matter of Example 20, wherein the apparatus may further comprise means for, if it is determined that the selected RU is allocated to the STA for the FTM protocol: encoding, for transmission in the selected RU as part of the FTM protocol, an uplink null data packet (NDP) to enable an uplink timing measurement at the AP; decoding a downlink NDP received from the AP in the selected RU as part of the FTM protocol; and determining an FTM based at least partly on an arrival time of the downlink NDP at the STA or an arrival time of the uplink NDP at the AP.

In Example 22, the subject matter of one or any combination of Examples 20-21, wherein the apparatus may further comprise means for encoding the iFTMR frame for transmission in accordance with an orthogonal frequency division multiple access (OFDMA) technique or a multi-user (MU) technique.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising: memory; and processing circuitry, configured to:
encode, for transmission, a trigger frame (TF) that indicates resource units (RUs) that are available for contention based access by stations (STAs) for a fine timing measurement (FTM) protocol;
attempt to decode one or more initial fine timing measurement request (iFTMR) frames received in the indicated RUs;
encode, for transmission, a broadcast acknowledgement (ACK) frame that indicates whether at least one iFTMR frame was decoded;
for a decoded iFTMR frame:
allocate the RU corresponding to the decoded iFTMR frame to a corresponding STA for the FTM protocol; and
encode, for transmission in the corresponding RU, an initial fine timing measurement (iFTM) frame that includes an identifier of the corresponding STA.

2. The apparatus according to claim 1, the processing circuitry further configured to:
encode, for transmission in the corresponding RU as part of the FTM protocol, a downlink null data packet (NDP) to enable a downlink timing measurement at the corresponding STA;
decode an uplink NDP received from the corresponding STA in the corresponding RU as part of the FTM protocol; and
determine an FTM for the corresponding STA based at least partly on an arrival time of the downlink NDP at the corresponding STA or an arrival time of the uplink NDP at the AP.

3. The apparatus according to claim 1, wherein the identifier of the corresponding STA is a medium access control (MAC) address of the corresponding STA.

4. The apparatus according to claim 1, wherein the broadcast ACK frame excludes identifiers of STAs from which decoded iFTMRs are received.

5. The apparatus according to claim 4, the processing circuitry further configured to refrain from transmission of multi-user block ACK (M-BA) frames that include the identifiers of the STAs that transmitted the decoded iFTMRs.

6. The apparatus according to claim 1, wherein:
the decoded iFTMR includes a first high efficiency wireless (HEWz) parameters element that includes one or more proposed FTM parameters,
the iFTM frame includes a second HEWz parameters element that indicates whether the AP accepts the proposed FTM parameters.

7. The apparatus according to claim 6, the processing circuitry further configured to, if the corresponding STA is unassociated with the AP and if the AP accepts the proposed FTM parameters:
generate a pre-association identifier (pre-AID) for the corresponding STA; and
encode the iFTM to include the pre-AID in the second HEWz parameters element.

8. The apparatus according to claim 7, the processing circuitry further configured to, if the corresponding STA is unassociated with the AP and if the AP rejects the proposed FTM parameters:
encode the iFTM to indicate a failure code in a status field of the second HEWz parameters element, wherein the failure code indicates that the AP rejects the proposed FTM parameters.

9. The apparatus according to claim 6, wherein the proposed FTM parameters include an FTM response parameter that indicates one of:
immediate response, wherein FTM results are to be transmitted by the AP in a current availability window (AW) or in a next AW, and
delayed response, wherein FTM results are to be transmitted by the AP in another AW after the next AW.

10. The apparatus according to claim 1, the processing circuitry further configured to attempt to decode the iFTMR frames in accordance with an orthogonal frequency division multiple access (OFDMA) technique or a multi-user (MU) technique.

11. The apparatus according to claim 1, wherein the TF is a TF for Service Request (TSR).

12. The apparatus according to claim 1, the processing circuitry further configured to store the decoded iFTMR from the corresponding STA in the memory.

13. The apparatus according to claim 1, wherein the apparatus further includes a transceiver to:
transmit the TF and the broadcast ACK frame; and
receive the iFTMR frames.

14. The apparatus according to claim 1, wherein the processing circuitry includes a baseband processor to:
encode the TF and the broadcast ACK frame; and
attempt to decode the iFTMR frames.

15. A non-transitory computer-readable storage medium that stores instructions for execution by one or more processors to perform operations for communication by a station (STA), the operations to configure the one or more processors to:
decode a trigger frame (TF) that indicates resource units (RUs) that are available for contention based access by STAs for a fine timing measurement (FTM) protocol with an access point (AP);
select one of the RUs;
encode, for transmission in the selected RU, an initial fine timing measurement request (iFTMR) frame;
decode a broadcast acknowledgement (ACK) frame that indicates whether at least one iFTMR frame was decoded by the AP;
if the broadcast ACK frame indicates that at least one iFTMR frame was decoded by the AP:
decode an initial fine timing measurement (iFTM) frame in the selected RU; and
determine, based on a comparison between a medium access control (MAC) address of the STA and a MAC address included in the iFTM frame, whether the selected RU is allocated to the STA for the FTM protocol.

16. The non-transitory computer-readable storage medium according to claim 15, the operations to further configure the one or more processors to:
if it is determined that the selected RU is allocated to the STA for the FTM protocol:
encode, for transmission in the selected RU as part of the FTM protocol, an uplink null data packet (NDP) to enable an uplink timing measurement at the AP;

decode a downlink NDP received from the AP in the selected RU as part of the FTM protocol; and determine an FTM based at least partly on an arrival time of the downlink NDP at the STA or an arrival time of the uplink NDP at the AP.

17. The non-transitory computer-readable storage medium according to claim 15, the operations to further configure the one or more processors to:

encode the iFTMR frame for transmission in accordance with an orthogonal frequency division multiple access (OFDMA) technique or a multi-user (MU) technique.

18. A method of communication at an access point (AP), the method comprising:

encoding, for transmission, a trigger frame (TF) that indicates resource units (RUs) that are available for contention based access by stations (STAs) for a fine timing measurement (FTM) protocol;

attempting to decode one or more initial fine timing measurement request (iFTMR) frames received in the indicated RUs;

encoding, for transmission, a broadcast acknowledgement (ACK) frame that indicates whether at least one iFTMR frame was decoded;

for a decoded iFTMR frame:
allocating the RU corresponding to the decoded iFTMR frame to a corresponding STA for the FTM protocol; and encoding, for transmission in the corresponding RU, an initial fine timing measurement (iFTM) frame that includes an identifier of the corresponding STA.

19. The method according to claim 18, further comprising:

encoding, for transmission in the corresponding RU as part of the FTM protocol, a downlink null data packet (NDP) to enable a downlink timing measurement at the corresponding STA;

decoding an uplink NDP received from the corresponding STA in the corresponding RU as part of the FTM protocol; and determining an FTM for the corresponding STA based at least partly on an arrival time of the downlink NDP at the corresponding STA or an arrival time of the uplink NDP at the AP.

* * * * *